United States Patent
Ibáñez et al.

(10) Patent No.: US 11,479,167 B2
(45) Date of Patent: Oct. 25, 2022

(54) VEHICLE HEADLINER WITH AN INTEGRATED LIGHT MODULE HAVING A SPOTLIGHTING FUNCTION AND MANUFACTURING PROCESS THEREOF

(71) Applicant: GRUPO ANTOLÍN-INGENIERÍA, S. A., Burgos (ES)

(72) Inventors: Rubén Ibáñez, Burgos (ES); Jesús Escudero, Burgos (ES); Javier Cadiñanos, Burgos (ES)

(73) Assignee: GRUPO ANTOLÍN-INGENIERÍA, S. A., Burgos (ES)

( * ) Notice: Subject to any disclaimer, the term of this patent is extended or adjusted under 35 U.S.C. 154(b) by 0 days.

(21) Appl. No.: 17/538,208

(22) Filed: Nov. 30, 2021

(65) Prior Publication Data

US 2022/0203890 A1    Jun. 30, 2022

(30) Foreign Application Priority Data

Dec. 29, 2020 (EP) .................................... 20383171

(51) Int. Cl.
*B60Q 3/54* (2017.01)
*B60Q 3/80* (2017.01)
*B60Q 3/76* (2017.01)
*B60Q 3/60* (2017.01)

(52) U.S. Cl.
CPC ............... *B60Q 3/54* (2017.02); *B60Q 3/60* (2017.02); *B60Q 3/76* (2017.02); *B60Q 3/80* (2017.02)

(58) Field of Classification Search
CPC ... B60Q 3/54; B60Q 3/60; B60Q 3/76; B60Q 3/80
See application file for complete search history.

(56) References Cited

U.S. PATENT DOCUMENTS

| | | |
|---|---|---|
| 5,070,434 A | 12/1991 | Suman et al. |
| 6,152,590 A | 11/2000 | Furst et al. |
| 7,311,426 B2 | 12/2007 | Tiesler et al. |
| 2008/0112175 A1 | 5/2008 | Bucher |
| 2017/0291536 A1 | 10/2017 | Cannon |

FOREIGN PATENT DOCUMENTS

| | | |
|---|---|---|
| DE | 102017217916 A1 | 4/2019 |
| EP | 2415639 A1 | 2/2012 |
| EP | 2572936 B1 | 2/2019 |
| ES | 2755173 A2 | 4/2020 |
| WO | 2008116208 A2 | 9/2008 |
| WO | 2016166386 A1 | 10/2016 |
| WO | 2017/203171 A1 | 11/2017 |

OTHER PUBLICATIONS

May 31, 2021—(EPO) Search Report and Written Opinion.

*Primary Examiner* — Thomas M Sember

(74) *Attorney, Agent, or Firm* — Banner & Witcoff, Ltd.

(57) ABSTRACT

Vehicle headliner with an integrated lighting module having a spotlighting function and manufacturing process thereof. Particularly the lighting module is attached to the back side of the headliner which is configured to emit a quality spotlighting beam L4 and to have a good aesthetic appearance. The headliner mainly comprises a substrate, a positioner frame, a decorative lining and a transparent sheet having diffusing areas and the lighting module comprises a printed circuit board, several spotlighting LEDs connected to the printed circuit board and an one piece optics comprising several collimator lens.

19 Claims, 8 Drawing Sheets

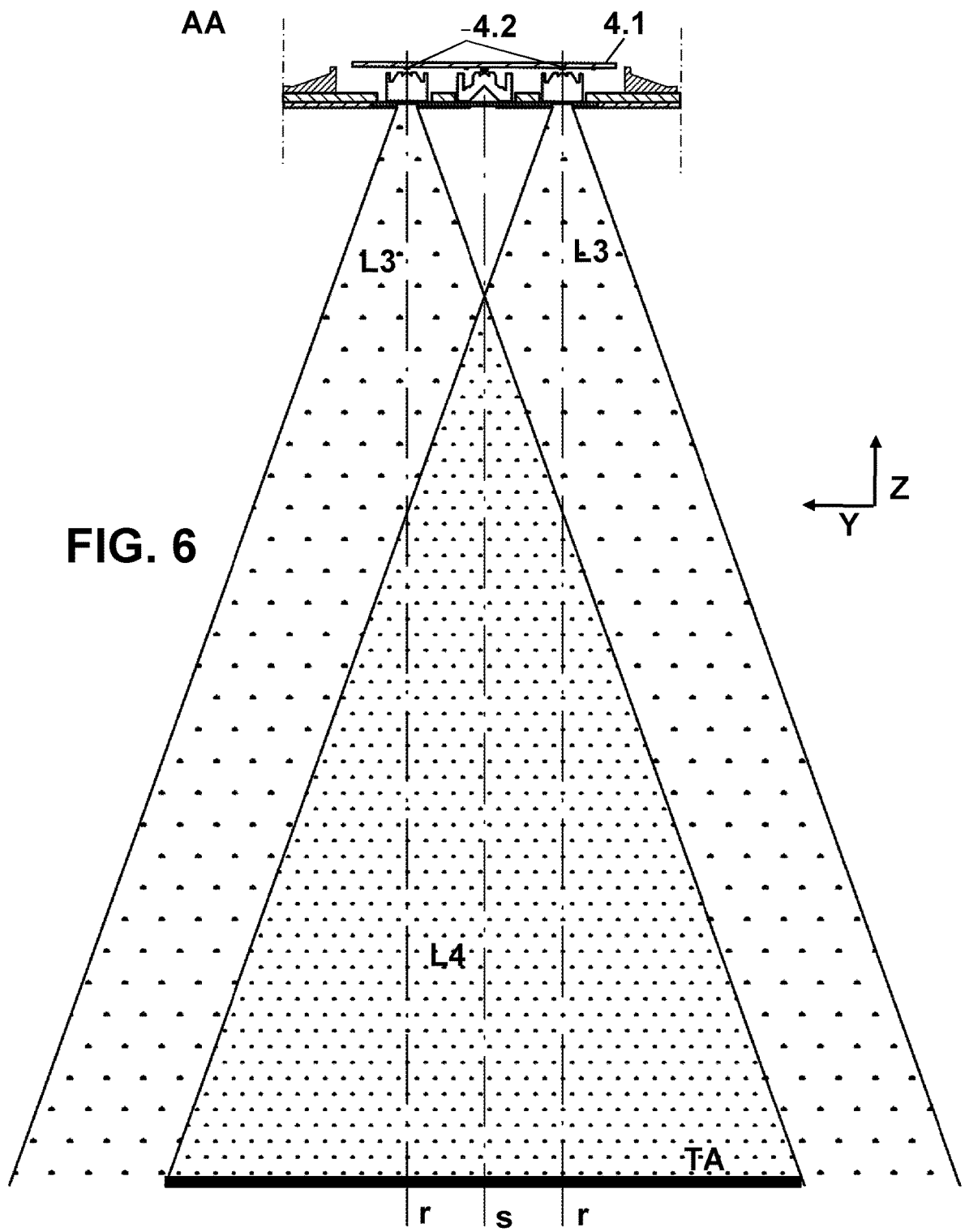

VEHICLE HEADLINER WITH AN INTEGRATED LIGHT MODULE HAVING A SPOTLIGHTING FUNCTION AND MANUFACTURING PROCESS THEREOF

The present application claims foreign priority under 35. U.S.C. 119 to European Patent Office Application No. EP20383171.4 filed on Dec. 29, 2020, the content of which is incorporated by reference in their entirety.

FIELD OF THE INVENTION

The present invention relates to a vehicle headliner with an integrated lighting module having a spotlighting function and manufacturing process thereof. Particularly the lighting module is attached to the back side of the headliner in such a way that it is hidden when the headliner is assembled in a vehicle roof.

According to the invention spotlighting means a light appropriate to read comprising a light beam enough intense and uniform directed to a target area.

The target area is the area of the vehicle cabin where a vehicle occupant can read according to his/her usual position in the vehicle cabin a wherein the lighting provided is enough intense and enough uniform to allow the reading. Said target area is defined by the vehicle manufacturer and it depends on the vehicle manufacturer standards and in turn, on the vehicle cabin dimensions.

BACKGROUND OF THE INVENTION

It is known lighting devices attached to the vehicle headliner to provide in the vehicle cabin a lighting function such as ambient or decorative lighting, signaling lighting or spotlighting for a reading function.

This kind of lighting devices are attached to the headliner through openings provided on it in such a way that they are seen and accessible by the vehicle occupant when the headliner is mounted on the vehicle roof.

Some examples for illustrating this kind of lighting devices are described for example in the patent documents ES2755173A2, U.S. Pat. No. 7,311,426B2 or U.S. Pat. No. 5,070,434A.

Due to the fact said devices protrude with regard to the headliner main surface they have disadvantages from an aesthetic point of view and from a safety point of view.

It is also known lighting devices integrated in the headliner in such a way that they are hidden when the headliner is mounted in the vehicle roof. It means that the visual appearance of the headliner does not change due to the fact it incorporates a lighting device when it is seen from the vehicle cabin.

This kind of lighting devices can be embedded between the layers forming the headliner or attached to the back side thereof. In some of these cases it is necessary to provide holes so that the light can pass through the headliner to reach the vehicle cabin.

Some examples for illustrating this kind of lighting devices are described for example in the patent documents WO2016166386A1 or EP2572936B1.

In either case, said integrated lighting devices are appropriate to provide only ambient or decorative lighting due to the fact that the configuration and/or the arrangement of the different components forming the assembly cannot provide a light beam having an intensity and an uniformity enough to provide spotlighting.

Finally, from the document US20170291536A1 it is known a headliner with an integrated lighting device having a spotlighting function wherein the lighting device is attached to the back side of the headliner and wherein the headliner comprises spotlighting holes in order to the light can pass through them from the lighting device to the vehicle cabin.

According to the disclosure of this document it is not possible to know how a spotlighting beam having an appropriate quality for reading is obtained in the vehicle cabin.

According to the present invention, a spotlighting beam having an appropriate quality is defined as a light beam having a sufficient intensity and a sufficient uniformity directed to the target area.

A sufficient intensity means an intensity enough to allow the reading function in the target area.

Due to economic, availability and standardization reasons, normally, the lighting devices provided in the vehicle cabin comprise standard LEDs as light source. Said standard LEDs by themselves, cannot provide an intensity enough to perform the spotlighting function.

In addition, since the lighting module is attached to the back side of the headliner, it is necessary provide holes to allow the light passing through the headliner to the vehicle cabin.

In order to avoid light losses and consequently improve the intensity of the light beam reaching the vehicle cabin, it is very important to ensure the alignment of all the openings provided with the lighting device.

A sufficient uniformity means that the lighting reaching the target area is uniform throughout thereof. It means that the target area has not lighting portions with different intensities which makes the reading difficult and uncomfortable.

Therefore, it is considered that the document US20170291536A1 mentions the spotlighting function as one more option among the possible lighting functions considered by the invention, without solving the particular problems related to this particular spotlighting function, particularly when the lighting device is attached to the back side of the headliner.

In view of the disadvantages mentioned above, the object of the invention is a vehicle headliner with a lighting module having a spotlighting function wherein the lighting module is attached to the back side thereof in such a way that it is not visible from the vehicle cabin and wherein the lighting module comprises LEDs as light source, which is configured to emit a quality spotlighting beam and to have a good aesthetic appearance.

DESCRIPTION OF THE INVENTION

The present invention is defined and characterized by the independent claims, while the dependent claims describe additional features thereof.

Due to the fact the lighting module is attached to the back side of the headliner, it has a good visual aspect when it is seen from the vehicle cabin. This means that it has not significant visual discontinuities over the visible side thereof, namely over the decorative lining.

In addition, due to the fact the lighting device is behind the layers forming the headliner, the vehicle occupant is protected by a soft structure, such as the headliner, against the parts forming the lighting device. Therefore, this configuration is safer than those which provide the lighting device in the front side of the headliner, in some cases as protruding parts.

The arrangement of the present invention on the one hand, is configured to obtain a spotlighting beam L4 from the overlapping of individual third light beams L3 emitted through the headliner to the vehicle cabin. This allows obtaining a spotlighting beam L4 having a sufficient intensity by using standard LEDs as light source due to the collaboration between them.

On the other hand, the arrangement of the different parts forming the whole assembly, wherein each of them fulfills a particular function and occupies a particular relative position, allows obtaining a quality spotlighting beam in the vehicle cabin, that is a light beam having a sufficient intensity and a sufficient uniformity directed to the target area.

This is due to the fact that each of the individual third light beam L3 emitted through the headliner to the vehicle cabin in order to obtain the spotlighting beam L4 by the overlapping of all of them, has by itself a sufficient intensity and a sufficient uniformity.

The lighting module of the invention comprises a one piece optics having several collimator lens each of them aligned with the corresponding spotlighting LED along the main axis "r".

Therefore, each collimator lens receives a first light beam L1 emitted by the corresponding spotlighting LED in order to concentrate it in such a way that it emits a concentrated light beam, the second light beam L2 which is transmitted towards the transparent sheet through the first spotlighting holes of the substrate.

As the light beam directly emitted by the spotlighting LED tends to open as it distances from the spotlighting LED, the collimator lens concentrates the first light beam L1 in such a way that most of the light emitted by the spotlighting LED is transmitted from each collimator lens towards the corresponding first spotlighting hole of the substrate.

In this way, the one piece optics contributes to ensure the appropriate intensity of the spotlighting beam and minimizes the light losses provoked by spotlighting LEDs being distanced from the target area.

On the other hand, the one piece optics is attached directly to the printed circuit board having the spotlighting LEDS connected to it according to predefined positions. It allows ensuring the relative position between the spotlighting LEDs and the collimator lens. In this way, the efficiency of the collaboration between both components is ensured and it contributes to ensure the appropriate intensity of the second lighting beam L2.

On the other hand, the fact that the one piece optics is a single piece makes easier its assembly on the printed circuit board and consequently its positioning regarding the several spotlighting LEDs. In this way, the efficiency of the collaboration between both components is also ensured, contributing to ensure the appropriate intensity of the second lighting beam L2.

The transparent sheet placed between the substrate and the decorative lining comprises diffusing areas each of them aligned with the first spotlighting hole along the main axis "r" in order to receive the corresponding second light beam L2 and to uniformize it in order to obtain a uniform and concentrated light beam, the third light beam L3. Each of them is transmitted to the vehicle cabin through the corresponding second spotlighting perforated area.

In this way, the diffusing areas of the transparent sheet ensure the appropriate uniformity of every third light beam L3, which contributes to ensure the uniformity of the resulting spotlighting beam L4 obtained by the overlapping of all of them.

In addition, when the headliner is observed from the vehicle cabin, the diffusing areas hide the parts of the lighting module being behind the transparent sheet.

On the other hand, the transparent sheet by itself, covers the first spotlighting holes in such a way the decorative lining is attached to an even surface instead of a surface having the discontinuities due to the first spotlighting holes. It results in a decorative lining surface without defects affecting the visual appearance of the headliner.

In addition, due to the fact that the sheet is transparent, it allows the light pass through it.

On the other hand, all the parts involved in the spotlighting function, are aligned between them along the main axis "r".

Particularly, each spotlighting LED is aligned with the corresponding collimator lens, the corresponding first spotlighting hole, the corresponding diffusing area and the corresponding second spotlighting perforated area.

In this way, each part involved can fulfill its particular function minimizing light losses provoked due to lack of alignment, which contributes directly to obtain a spotlighting beam having an appropriate intensity.

The way to ensure said alignment between all the parts, is to ensure the relative positions of each part in relation to the positions of the others.

The positioner frame contributes to ensure the relative positions of several of the parts involved in the spotlighting function.

Firstly, the positioner frame is directly attached to the substrate by the first attaching means and the first spotlighting holes are configured in said substrate. It means that either the positioner frame or the first spotlighting holes can be positioned in relation to the substrate and to each other. In any of the above cases, the relative position between the positioner frame and the first spotlighting holes are ensured.

After this, the second spotlighting perforated areas and the diffusing areas are configured in the respective parts, namely, the decorative lining and the transparent sheet. Both, can be positioned in relation to the positioner frame, either directly or indirectly by the substrate. Thus, second spotlighting perforated areas and the diffusing areas are positioned in relation to the positioner frame. As the positioner frame is positioned in relation to the first spotlighting holes, the relative position between the positioner frame, the first spotlighting holes, the diffusing areas and the second spotlighting perforated areas are ensured.

Finally, the lighting module is attached directly to the positioner frame which in turn is positioned in relation to the first spotlighting holes, the diffusing areas and the second spotlighting perforated areas. The position of the lighting module in relation to the positioner frame is ensured by the third attachment means.

The lighting module comprises on the one hand, the printed circuit board with the spotlighting LEDs connected to it according to well defined positions which are ensured during its manufacturing process, on the other hand, said printed circuit board comprises the one piece optics which is also connected to it in such a way that each collimator lens is aligned with the corresponding spotlighting LED, this position being ensured by the second attachment means. It means that the relative positions of all the parts forming the lighting module are ensured.

Thus, when the lighting module is attached as a single unit to the positioner frame, the positions of all its parts are ensured in relation to the rest of the parts involved in the lighting function, namely the first spotlighting holes, the diffusing areas and the second spotlighting perforated areas ensuring in this way the alignment of all the parts between them along the main axis "r".

The optional embossing provided on the substrate of the headliner for housing the lighting module allows improving the packaging due to it contributes to minimize the space occupied by the lighting module in the Z direction. It means that the available space in the vehicle cabin can be maximized.

The invention also relates to the manufacturing process of a vehicle headliner with an integrated lighting module having a spotlighting function.

The particular steps defined by said manufacturing process and when they are carried out, allows ensuring the relative positions of all the parts involved in the spotlighting function. Consequently, it ensures that all said parts are aligned between them, namely, each spotlighting LED, the corresponding collimator lens, the corresponding first spotlighting hole, the corresponding diffusing area and the corresponding second spotlighting perforated area.

In this way, it is ensured that each part involved can fulfill its particular function minimizing light losses provoked due to lack of alignment, what directly contributes to obtain a spotlighting beam having an appropriate intensity.

DESCRIPTION OF THE FIGURES

The present descriptive memory is completed by a set of figures illustrating the preferred embodiment and in no way limiting the invention.

FIG. 6 shows a cross-sectional view of a vehicle headliner with an integrated lighting module according to the plane AA represented in the FIG. 2.

DETAILED DESCRIPTION OF THE INVENTION

Figure 1:
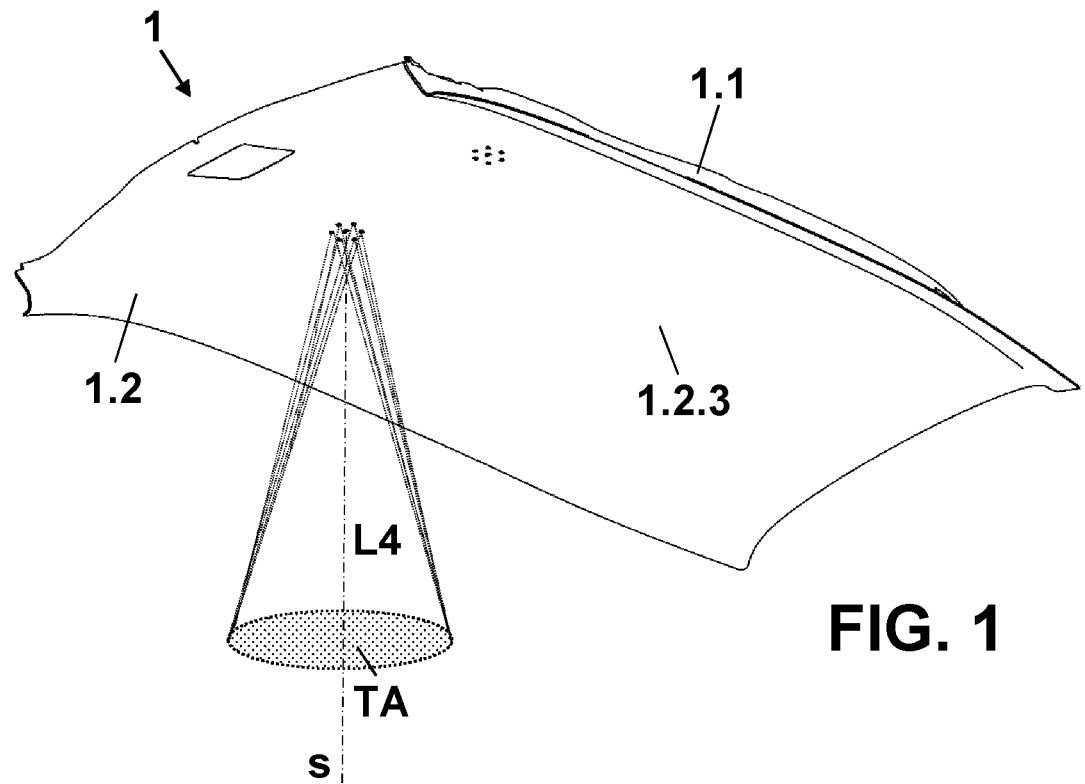
FIG. 1 shows a perspective view of a vehicle headliner with an integrated lighting module having a spotlighting function seen from the decorative lining side.
Figure 2:
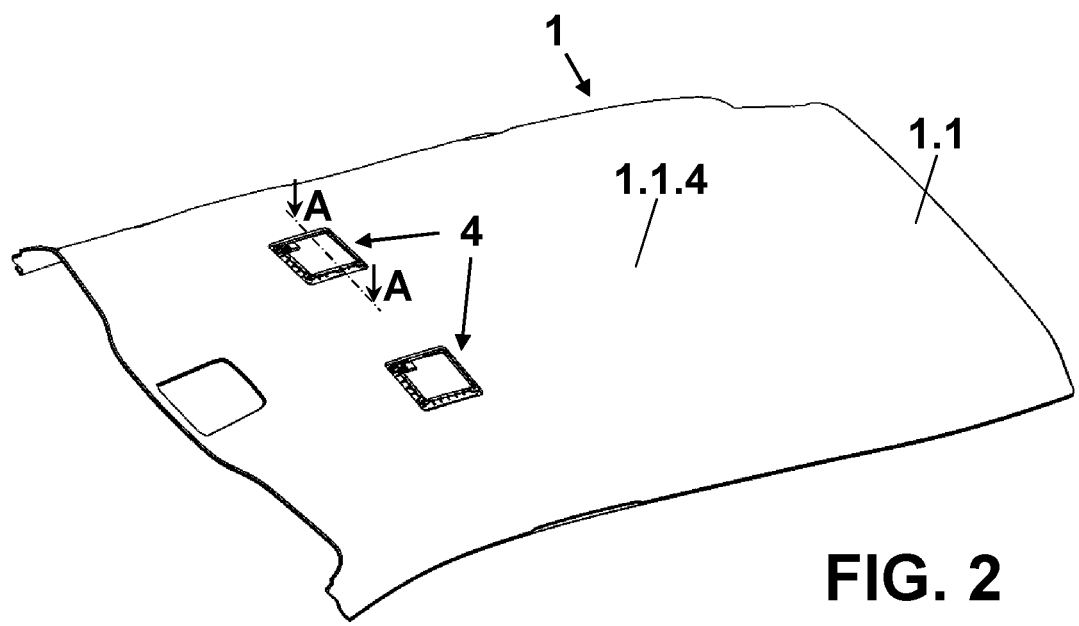
FIG. 2 shows a perspective view of a vehicle headliner with an integrated lighting module having a spotlighting function seen from the substrate side.

FIGS. 1 and 2 show a headliner (1) with an integrated lighting module (4) having a spotlighting function according to the invention. FIG. 1 shows the side of the headliner (1) facing the vehicle cabin (not represented) when the headliner (1) is assembled in the vehicle roof and FIG. 2 shows the side thereof facing the vehicle roof (not represented) wherein the lighting module (4) is attached.

As FIG. 1 shows, the vehicle headliner (1) of the present invention is configured to emit a spotlighting beam L4 having a main axis "s".

The main axis "s" can be formed by the line connecting the center of the target area TA with the center or the barycenter formed by the area defined by all the spotlighting LEDs forming the lighting module (4).

As the target area TA is defined by the vehicle manufacturer, the main axis "s" direction also will depend on the vehicle manufacturer. Thus, said main axis can be perpendicular to the headliner (1), for example parallel to the Z direction, or it can be tilted with respect to the Z direction.

Figure 3:
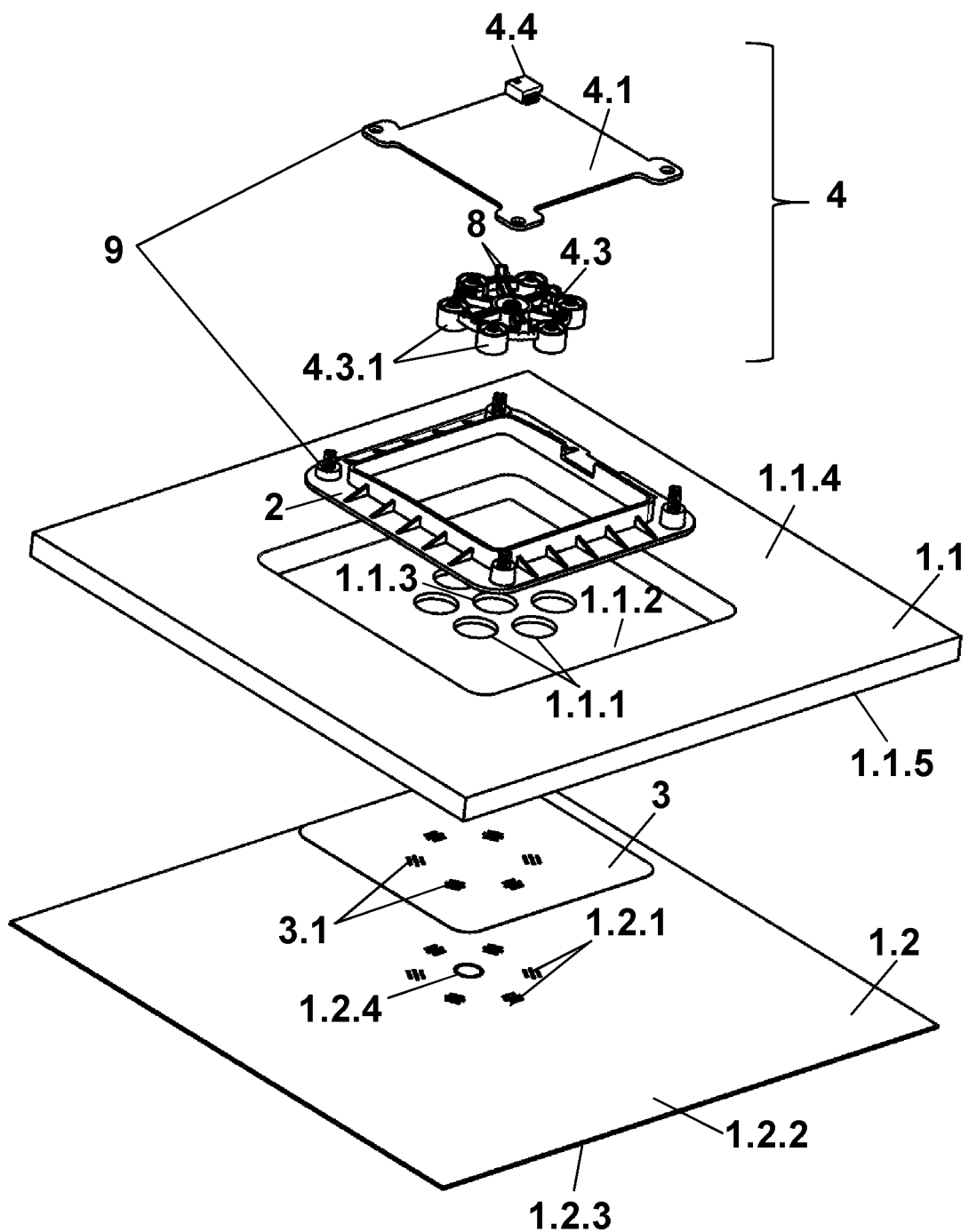
FIG. 3 shows an exploded view of a vehicle headliner with an integrated lighting module according to a first embodiment of the invention.
Figure 4:
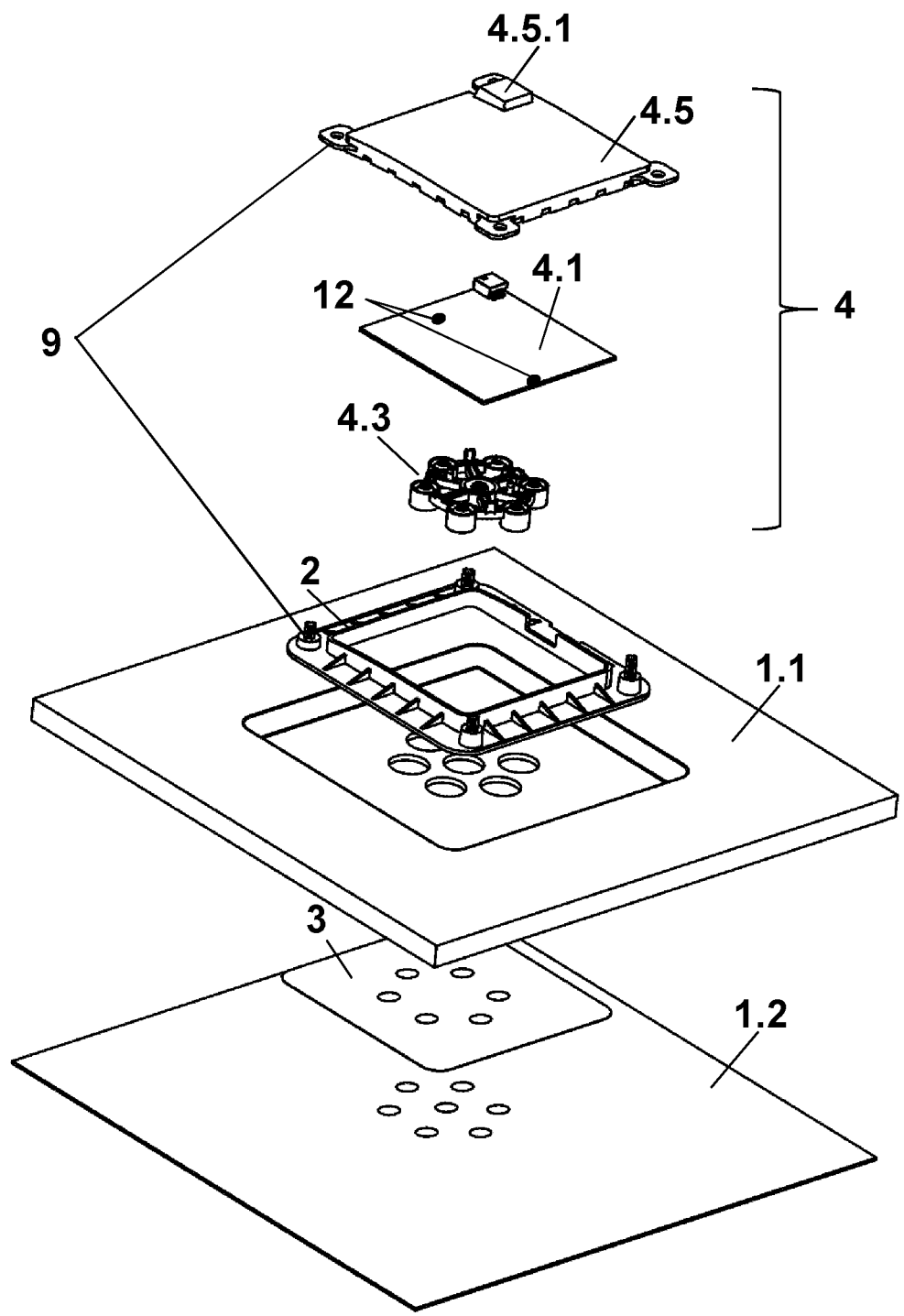
FIG. 4 shows an exploded view of a vehicle headliner with an integrated lighting module according to a second embodiment of the invention.

As FIGS. 3 and 4 show, the headliner (1) mainly comprises a substrate (1.1), a positioner frame (2), a decorative lining (1.2) and a transparent sheet (3).

The substrate (1.1) has a first side (1.1.4), configured to face the vehicle roof, a second side (1.1.5), configured to face the decorative lining (1.2) and first spotlighting holes (1.1.1), particularly through holes. The first spotlighting holes (1.1.1) are configured to allow the light emitted by the lighting module (4) passing through them.

The shape of the first spotlighting holes (1.1.1) can be circular as the figures show, or it can be polygonal or a combination of both.

The substrate can comprise an embossing (1.1.2) configured as a reduction of the thickness of the substrate (1.1) in the first side (1.1.4). The lighting module (4) is housed, at least partially, in said embossing (1.1.2).

The positioner frame (2) is attached to the first side (1.1.4) of the substrate (1.1) by first attachment means (7) such as adhesive, clips or ultrasound welded means.

The positioner frame (2) can comprise a plastic frame with a squared shape as figures represent. Other shapes are also considered by the present invention.

According to a particular configuration, the positioner frame (2) is attached to the area defined by the embossing (1.1.2).

The decorative lining (1.2) covers the substrate (1.1). It has a third side (1.2.2) facing the second side (1.1.5) of the substrate (1.1) and a fourth side (1.2.3) facing the vehicle cabin and second spotlighting perforated areas (1.2.1), particularly through perforated areas. The second spotlighting perforated areas (1.2.1) are configured to allow the light emitted by the lighting module (4) passing through them.

The shape of the second spotlighting perforated areas (1.2.1) can be circular as the FIG. 4 shows, or it can be polygonal or a combination of both. Additionally, said perforated areas as FIG. 3 shows, can be formed by several perforated portions such as holes or slots, configured over the area defined by said second spotlighting perforated areas (1.2.1).

The decorative lining (1.2) can be opaque or translucent. If this is translucent, it is necessary to provide a mask (6) as it will be explained below.

Particularly, the decorative lining (1.2) can be a textile, a film, a leather or a flocked cover. In addition, it can comprise one layer or several layers, for example in the case it comprises a soft touch layer such as a foam or a spacer fabric laminated to any of the decorative layers above cited.

The transparent sheet (3) has a fifth side (3.2) facing the second side (1.1.5) and a sixth side (3.3) facing the third side (1.2.2) and it is sandwiched between the substrate (1.1) and the decorative lining (1.2). It covers the first spotlighting holes (1.1.1) and the second spotlighting perforated areas (1.2.1).

Particularly, it comprises diffusing areas (3.1) at its sixth side (3.3), each of them is placed in correspondence with a first spotlighting hole (1.1.1) and a second spotlighting perforated area (1.2.1) in such a way that all of them are aligned along the main axis "r".

The shape of the diffusing areas (3.1) can be circular as the FIG. 3 shows, or it can be polygonal or a combination of both.

Additionally, said diffusing areas as FIG. 3 shows, can be formed by several diffusing portions having any shape, configured over the area defined by said diffusing area (3.1).

Preferably, the shape and the dimension of each diffusing area (3.1) coincides with the ones corresponding to the second spotlighting perforated area (1.2.1) aligned with the referred diffusing area (3.1) as FIGS. 3 and 4 show.

The transparent sheet (3) is preferably made of plastic material such as polycarbonate (PC) or Poly(methyl methacrylate) (PMMA).

The transparent sheet (3) can comprise a thickness in the range of 0.1 to 1 mm. More preferably the thickness is in the range of 0.15 and 0.35 mm.

Figure 7:
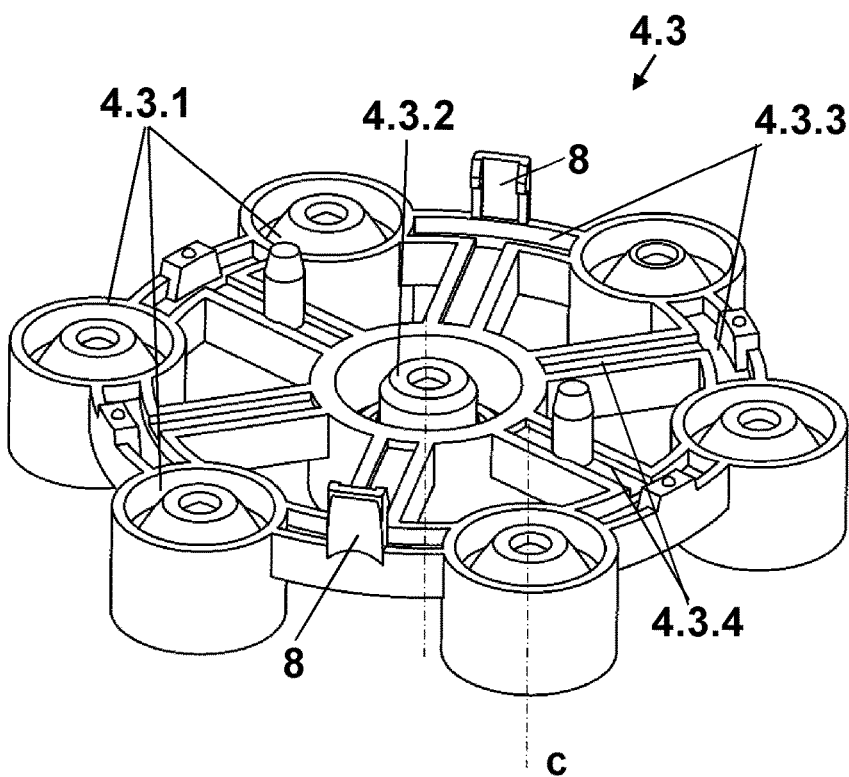
FIG. 7 shows a perspective view of an one piece optics according to the invention.
Figure 8:
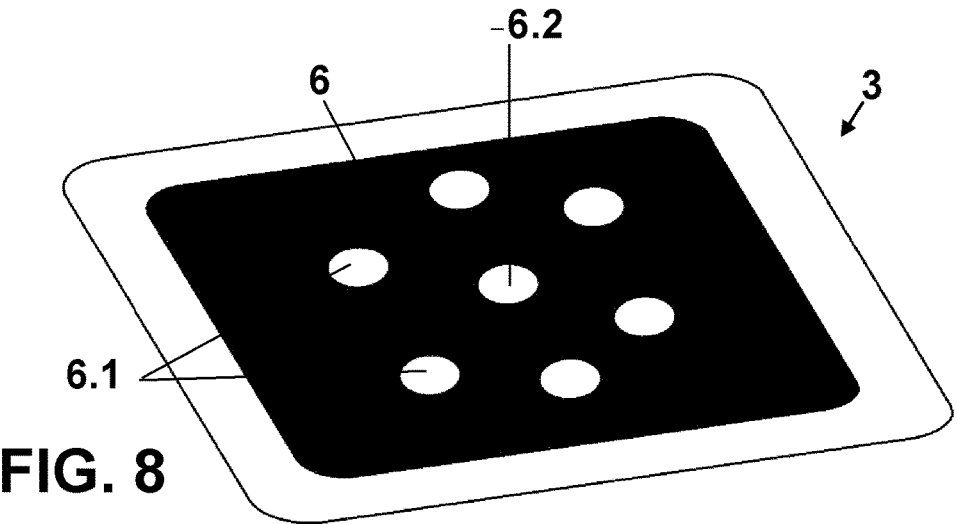
FIG. 8 shows a transparent sheet comprising a mask.
Figure 9:
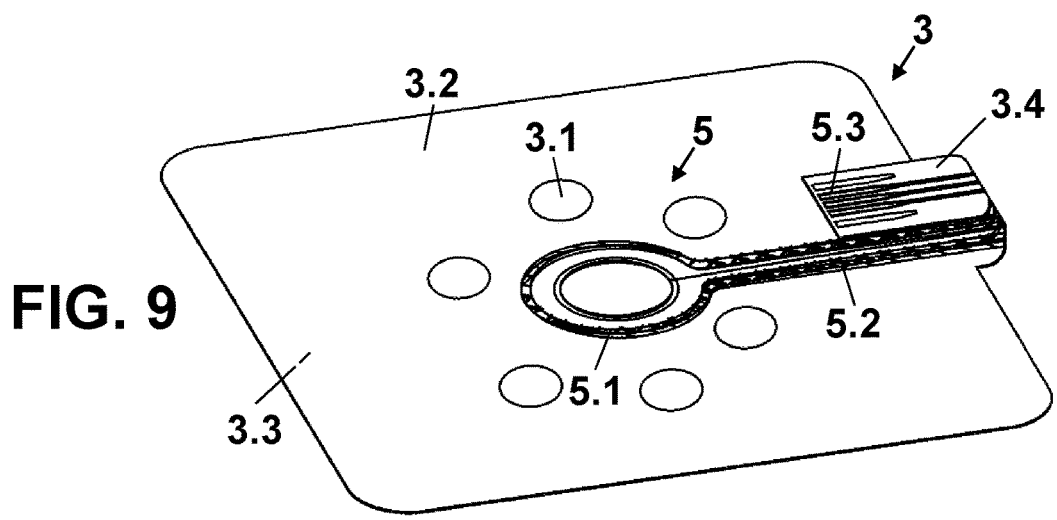
FIG. 9 shows a transparent sheet with a sensor screen printed directly on it.
Figure 10:
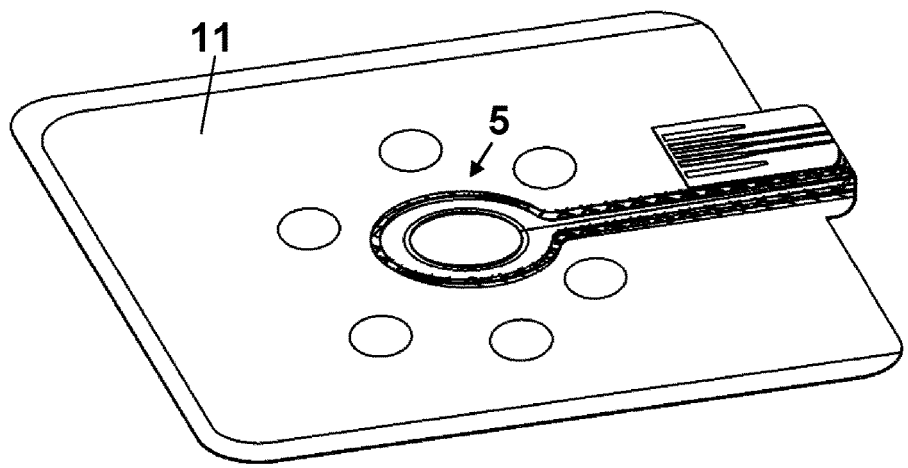
FIG. 10 shows a transparent sheet with a laminated transparent film comprising a sensor screen printed on it.

According to an embodiment of the invention represented in FIGS. 7 and 8, the transparent sheet (3) further comprises a proximity sensor (5). It can be placed on the fifth side (3.2) or on the sixth side (3.3) of the transparent sheet (3).

The proximity sensor (5) switches on/off the lighting module (4) in order to activate or deactivate the spotlighting function.

Particularly, the proximity sensor (5) comprises a sensing area (5.1) which detects the proximity of the occupant hand, a sensor circuit (5.2) connecting the sensing area (5.1) with a proximity sensor terminal, and a proximity sensor terminal (5.3) for connecting the proximity sensor (5) with the printed circuit board (4.1) responsible of controlling the switching function. The proximity sensor terminal (5.3) in turn can comprise a sensor connector cover (not represented).

The proximity sensor terminal (5.3) can be configured over a tab (3.4) protruding the transparent sheet (3) in order to connect the proximity sensor (5) with the printed circuit board (4.1). Said tab (3.4) can reach the printed circuit board (4.1) passing through a corresponding proximity sensor hole (not represented) provided in the substrate (1.1).

Preferably, the proximity sensor (5) is a capacitive sensor, but the invention also considers other sensors such as for example inductive or resistive.

The proximity sensor (5) can be configured by screen printing directly on the transparent sheet (3). It also can be configured indirectly by screen printing on a transparent film (11) laminated on the transparent sheet (3).

According to an embodiment of the invention represented in FIG. 8, the transparent sheet (3) can further comprise a mask (6). It is preferably placed on the sixth side (3.3) of the transparent sheet (3).

The mask (6) can be present in a case in which the decorative lining (1.2) is translucent.

According to this particular case, the mask (6) comprises third spotlighting areas (6.1) aligned with the first spotlighting holes (1.1.1) along the main axis "r".

In this way, the mask (6) allows the light emitted by the lighting module (4) only passing through the second spotlighting perforated areas (1.2.1) and not through other decorative lining (1.2) areas.

The mask (6) can be configured by screen printing either on the transparent sheet (3) directly or on a transparent film (11) laminated on the transparent sheet (3).

The third spotlighting areas (6.1) can be configured by removing part of the material forming the mask (6) for example by lasering, or they can be configured by applying locally the material that forms the mask (6).

Figure 5:
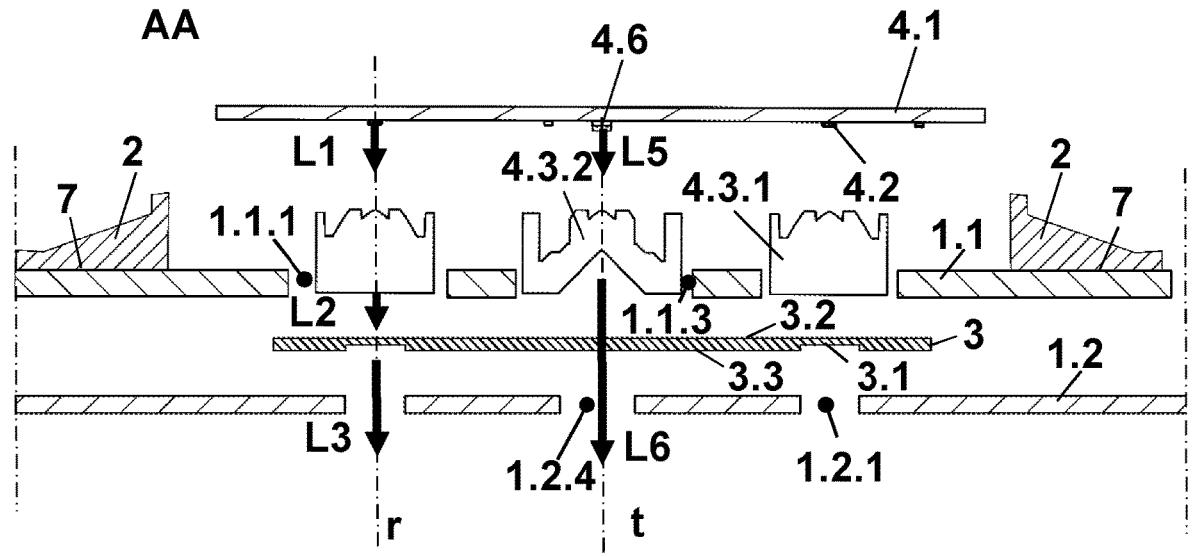
FIG. 5 shows a exploded cross-sectional view of a vehicle headliner with an integrated lighting module according to the plane AA represented in the FIG. 2.

As FIGS. 3 and 5 show, the lighting module (4) comprises:
    a printed circuit board (4.1) having an electric connector (4.4) configured to connect the printed circuit board (4.1) to the vehicle wiring (not represented),
    several spotlighting LEDs (4.2) connected to the printed circuit board (4.1) and configured each of them to emit a first light beam L1 having a main axis "r".
    Preferably all the main axes "r" corresponding each of them to each of the spotlighting LEDs (4.2) are parallel between them as FIG. 6 shows, and more preferably in order to ensure a right direction of the spotlighting beam L4, said main axes "r" are parallel to the main axis "s".
    an one piece optics (4.3) comprising several collimator lens (4.3.1) each of one being in correspondence with each of the spotlighting LED (4.2).

According to a particular configuration represented in FIG. 7, the several collimator lens (4.3.1) forming the one piece optics (4.3) are provided along a ring which connects all of them, in such a way that the one piece optics (4.3) alternates collimator lens (4.3.1) and free portions (4.3.3) according to a circular disposition.

The one piece optics (4.3) is attached to the printed circuit board (4.1) by second attachment means (8). Said attachment means can be clips, ultrasound welded means or screws.

The one piece optics (4.3) preferably is made of plastic material such as polycarbonate (PC) or Poly(methyl methacrylate) (PMMA).

In turn, the lighting module (4) is attached to the positioner frame (2) by third attachment means (9). Said attachment means can comprise clips or ultrasound welded means.

Optionally, as FIG. 4 shows, the lighting module (4) can comprise a cover (4.5) which encloses the printed circuit board (4.1) between said cover (4.5) and the first side (1.1.4) of the substrate (1.1).

The cover (4.5) can comprise a connector housing (4.5.1) to house the electric connector (4.4) provided in the printed circuit board (4.1) for connecting said printed circuit board (4.1) to the vehicle wiring, or it can comprise only just an opening to allow the connector (4.4) pass through.

According to this particular case comprising the cover (4.5), the assembly formed by the printed circuit board (4.1), the spotlighting LEDs (4.2) and the one piece optics (4.3) can be attached to the cover (4.5) by fourth attachment means (12) and the resulting assembly, that is, the lighting module (4) according to this particular configuration, is attached as a single unit to the positioner frame (2) by the third attachment means (9).

As FIGS. 5 and 6 show, each spotlighting LED (4.2), the corresponding collimator lens (4.3.1), the corresponding first spotlighting hole (1.1.1), the corresponding diffusing area (3.1), and the corresponding second spotlighting perforated area (1.2.1), all of them are aligned along the main axis "r". It allows that the light generated by the spotlighting LEDs (4.2) can reach the vehicle cabin as a quality spotlighting beam L4, minimizing the light losses.

It means that the center of each spotlighting LED (4.2) is aligned along the main axis "r" with the main axis "c" of the corresponding collimator lens (4.3.1), with the center or the barycenter of the corresponding first spotlighting hole (1.1.1), with the center or the barycenter of the corresponding diffusing area (3.1) and with the center or barycenter of the corresponding second spotlighting perforated area (1.2.1), as FIG. 5 shows.

Thus, the light emitted by the lighting module (4) when it is active, is modified as it passes through the different components forming the vehicle headliner (1) in order to obtain a spotlighting beam L4 in the vehicle cabin, and particularly in the target area TA, having a quality according to the definition done above, that is, a spotlighting beam L4 having a sufficient intensity and a sufficient uniformity.

First, each spotlighting LED (4.2) emits a first light beam L1 towards the corresponding collimator lens (4.3.1).

Then, each collimator lens (4.3.1) concentrates the corresponding first light beam L1 in order to obtain a second light beam L2. Said second light beam L2 is emitted through the first spotlighting holes (1.1.1) towards the transparent sheet (3). In this way, most of the light emitted by the spotlighting LEDs (4.2) passes through the first spotlighting holes (1.1.1) minimizing light losses due to a too open light beam.

After that, each second light beam L2 reaches the corresponding diffusing area (3.1) in the transparent sheet (3). Said diffusing area (3.1) uniformizes the second light beam L2 in order to obtain a third light beam L3, being uniform and concentrated, which is in turn configured to be emitted through the second spotlighting perforated areas (1.2.1) to the vehicle cabin.

At this stage, all the individual third light beams L3 obtained are overlapped to form a single uniform spotlighting beam L4 directed to the target area TA as FIG. 6 shows.

As each individual third light beam L3 is uniform, the spotlighting beam L4 produced by the overlapping of all of them can also be uniform.

The overlapping is produced due to the spotlighting LEDs forming the lighting module (4) are sufficiently close between them.

According to a preferably configuration for a common target area smaller than 300 mm, it is estimated that the maximum distance between two spotlighting LEDs (4.2) belonging the lighting module (4) is less than 300 mm.

According to another preferably configuration for a larger area up to 700 mm, it is estimated that the maximum distance between two spotlighting LEDs (4.2) belonging to the lighting module (4) is less than 150 mm.

In addition, the particular configuration formed by the number and the relative position of the different spotlighting LEDs (4.2) can be symmetrical, as for example FIGS. 3 and 4 show, or it can be asymmetrical according to a configuration not represented.

Optionally, as FIG. 5 shows, the lighting module (4) can comprise a backlighting LED (4.6) connected to the printed circuit board (4.1), configured to emit a first signal light beam L5 having a main axis "t".

According to this particular case, the substrate (1.1) comprises a first backlighting hole (1.1.3) through which, the first signal light beam L5 can reach the vehicle cabin.

Said backlighting LED (4.6) acts as a signal light, that is, it illuminates the area where the proximity sensor (5) is hidden by the decorative lining (1.2) in order to enable the vehicle occupant to identify its position for activating or disactivating the spotlighting function.

In addition to the backlighting function, the backlighting LED can provide other functions related to warning signals such as incoming calls or open doors.

Optionally, as FIG. 5 shows, the one piece optics (4.3) can further comprise a diffuser lens (4.3.2) in order to uniformize the first signal light beam L5 in order to obtain a second signal light beam L6 which is in turn emitted through a corresponding first backlighting hole (1.1.3) provided in the substrate (1.1) towards the transparent sheet (3) and then towards the decorative lining (1.2) to finally reach the vehicle cabin.

The diffuser lens (4.3.3) can be provided at the center of the one piece optics (4.3) connected by radial portions (4.3.4) to the ring comprising the collimator lens (4.3.1).

In addition, according to this optional configuration, the decorative lining (1.2) can comprise a corresponding second backlighting perforated area (1.2.4) in order to allow the light passes through it, particularly, in the case in which the decorative lining (1.2) is opaque.

In the case in which the decorative lining (1.2) is translucent and a mask (6) is provided, this mask (6) comprises a third backlighting area (6.2) through which, the first signal light beam L5 can reach the vehicle cabin. The third backlighting area (6.2) is aligned with the first backlighting hole (1.1.3) along the main axis "t".

The present invention further relates to a manufacturing process for a vehicle headliner (1) with an integrated lighting module (4) having a spotlighting function according to the features described above.

Particularly, the manufacturing process comprises three main steps, namely I—manufacturing of the headliner (1) step, II—manufacturing of the lighting module (4) step and III—attaching of the lighting module (4) to the headliner (1) step.

Figure 11:
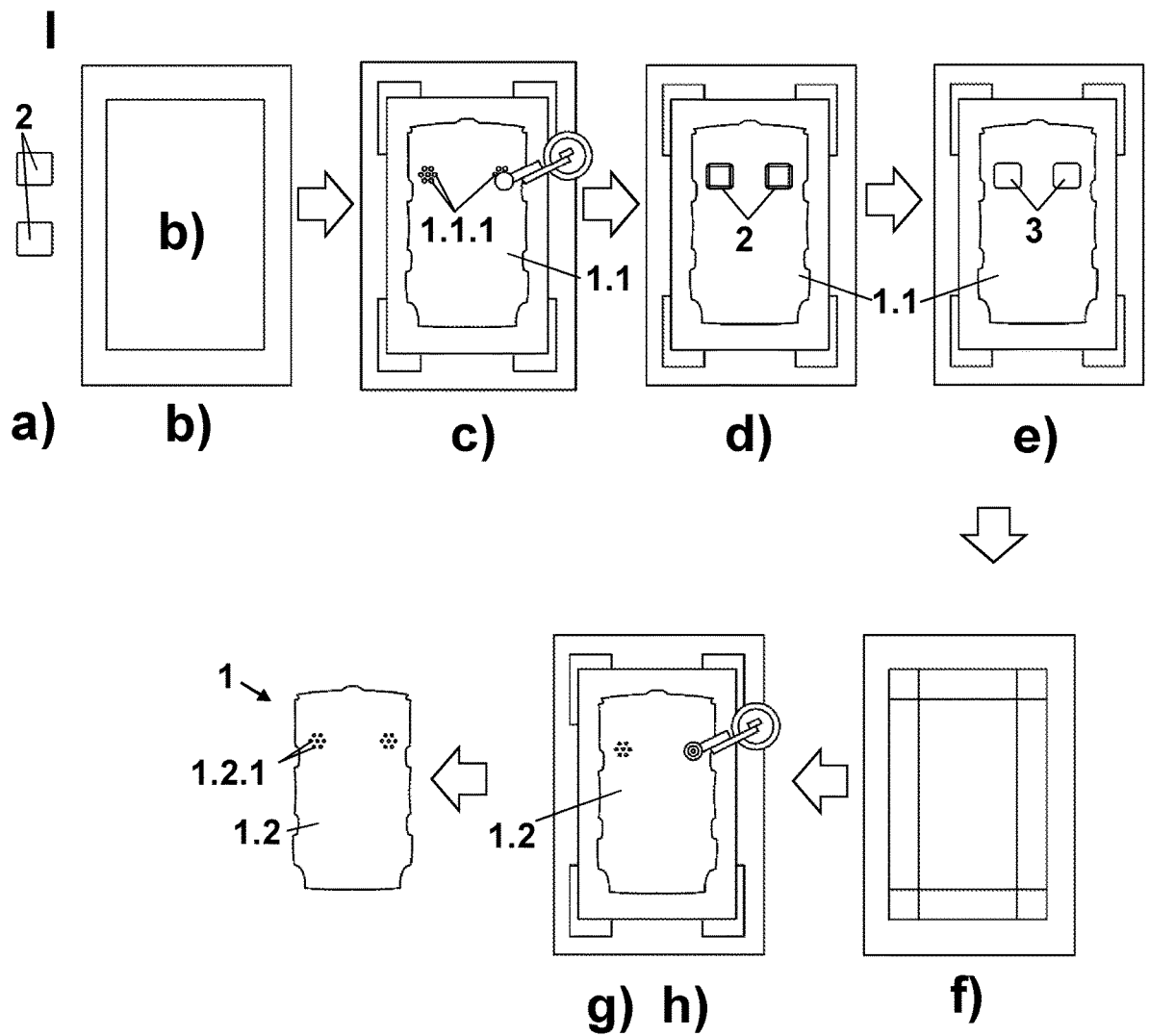
FIG. 11 shows a schematic representation of the manufacturing process of a vehicle headliner with an integrated lighting module having a spotlighting function wherein step I is represented.
Figure 12:
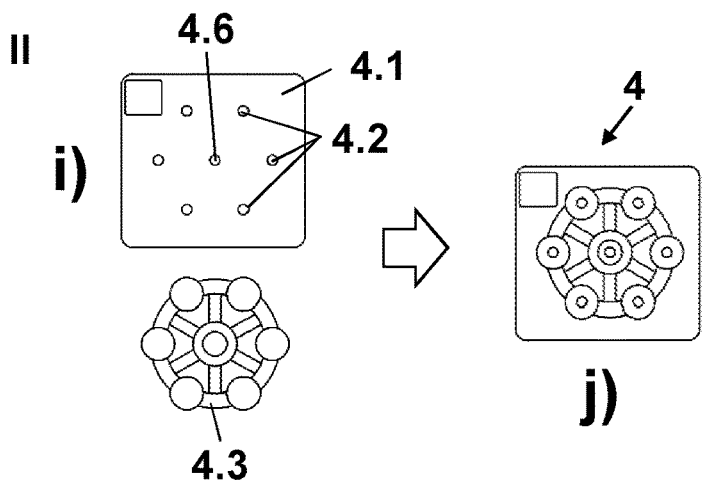
FIG. 12 shows a schematic representation of the manufacturing process of a vehicle headliner with an integrated lighting module having a spotlighting function wherein step II is represented according to a first embodiment.
Figure 13:
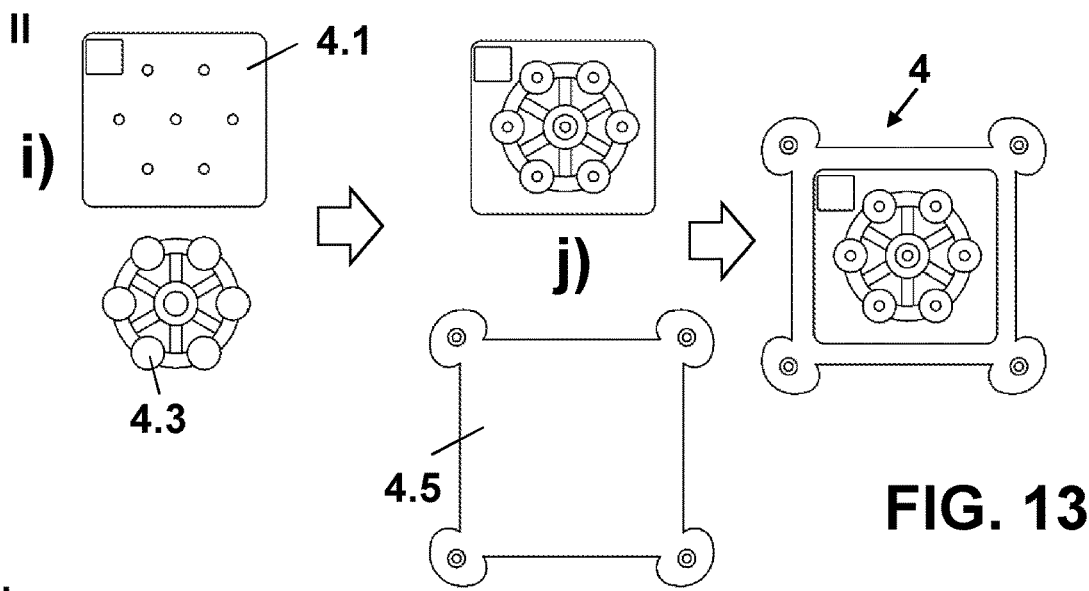
FIG. 13 shows a schematic representation of the manufacturing process of a vehicle headliner with an integrated lighting module having a spotlighting function wherein step II is represented according to a second embodiment.
Figure 14:
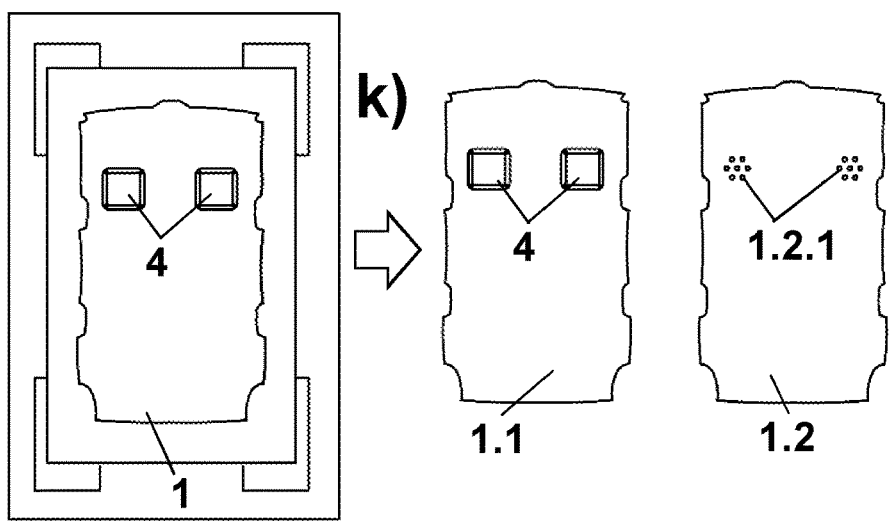
FIG. 14 shows a schematic representation of the manufacturing process of a vehicle headliner with an integrated lighting module having a spotlighting function wherein step III is represented.

I—The manufacturing of the headliner (1) step in turn, comprises the following steps:
 a) providing a transparent sheet (3),
 b) forming a substrate (1.1) having a first side (1.1.4) and a second side (1.1.5),
 c) attaching a positioner frame (2) to the first side (1.1.4) of the substrate (1.1) by first attaching means (7) ensuring the relative position between said positioner frame (2) and the substrate (1.1),
 d) providing first spotlighting holes (1.1.1) in the substrate (1.1) ensuring the relative position between said first spotlighting holes (1.1.1) and the substrate (1.1),
 e) attaching the transparent sheet (3) to the second side (1.1.5) of the substrate (1.1) covering the first spotlighting holes (1.1.1),
 f) attaching a decorative lining (1.2) having a third side (1.2.2) and a fourth side (1.2.3) to the substrate (1.1) in such a way that the third side (1.2.2) faces the second side (1.1.5),
 g) providing second spotlighting perforated areas (1.2.1) in the decorative lining (1.2) by lasering ensuring the relative position between said second spotlighting perforated areas (1.2.1) and the substrate (1.1),
 h) providing diffusing areas (3.1) in the transparent sheet (3) by lasering ensuring the relative position between said diffusing areas (3.1) and the substrate (1.1), According to a first embodiment of the invention, the steps b), c) and d) can be carried out sequentially, each of them in a different tool as FIG. 11 shows.

According to a second embodiment of the invention, the steps b) and c) can be simultaneously carried out using the same tool. In this case, the step d) is carried out outside the tool wherein the step b) is carried out.

According to this option the steps b) and c) are carried out in a forming press comprising a mould with the final shape of the substrate (1.1) wherein firstly, the positioner frame (2) is positioned according to a predefined position inside the mold, and secondly, the layer or the layers forming the substrate (1.1) are positioned inside the mold. In this way, once the substrate is formed by for example applying pressure and heat, the substrate (1.1) and the positioner frame (2) are connected forming a single part.

The positioner frame (2) and the substrate (1.1) are connected to each other by first attaching means (7). The first attachment means (7) can be applied on the positioner frame before introducing the layer or the layers forming the substrate (1.1) inside the mold.

As the positioner frame (2) is positioned according to a predefined position inside the mold, the position of the positioner frame (2) is ensured regarding the substrate (1.1).

Then, the step d) of providing the first spotlighting holes (1.1.1) in the substrate (1.1) is carried out in another tool. This tool can be for example a water-jet station, a punch-piercing station or a laser station.

Optionally, in this step d) the first backlighting hole (1.1.3) is also provided.

The step d) is carried out ensuring the relative position between said first spotlighting holes (1.1.1) and the substrate (1.1). As the positioner frame (2) forms a single part with the substrate (1.1) and the position thereof is ensured, the position of the first spotlighting holes (1.1.1) can be ensured regarding both parts.

This position can be ensured for example by using the positioner frame (2) as centering device to define the position of the first spotlighting holes (1.1.1) in the corresponding tool. This position also can be ensured by using other substrate part as centering device such as any of the holes provided for mounting the sunvisor.

According to a third embodiment, the steps b) and d) can be simultaneously carried out using the same tool. In this case, the step c) is carried out outside the tool wherein the step b) is carried out.

According to this case, the steps b) and c) are carried out in a forming press comprising a mould with the final shape of the substrate wherein firstly, the layer or the layers forming the substrate (1.1) are positioned inside the mold, secondly the substrate (1.1) is formed by for example applying pressure and heat, and finally, once the substrate (1.1) is formed the first spotlighting holes (1.1.1), and optionally the first backlighting hole (1.1.3), are carried out in the same forming press for example by piercing the substrate (1.1) with retractable blades. The first spotlighting holes (1.1.1) are carried out according to a predefined position. Thus, the position of the spotlighting holes (1.1.1) is ensured regarding the substrate (1.1).

Then, the step c) of attaching the positioner frame to the substrate comprising the first spotlighting holes (1.1.1) is carried out in another tool. This step c) is carried out ensuring the position of the positioner frame (2) regarding the substrate (1.1) comprising the first spotlighting holes (1.1.1).

As the position of the first spotlighting holes (1.1.1) regarding the substrate (1.1) is ensured, the position of positioner frame (2) can be ensured regarding both parts.

According to a fourth embodiment, the steps b), c) and d) can be simultaneously carried out using the same tool.

In this particular case, all the steps are carried out in a forming press which comprises a mould with the final shape of the substrate (1.1).

According to this case, firstly, the positioner frame (2) is positioned according to a predefined position inside the mold, secondly, the layer or the layers forming the substrate (1.1) are positioned inside the mold and the substrate (1.1) is formed by for example applying pressure and heat.

The positioner frame (2) and the substrate (1.1) are connected to each other by first attaching means (7). The first attachment means (7) can be applied on the positioner frame before introducing the layer or the layers forming the substrate (1.1) inside the mold.

Finally, once the substrate (1.1) is formed and it is connected to the positioner frame (2), the first spotlighting holes (1.1.1), and optionally the first backlighting hole (1.1.3), are carried out in the same forming press for example by piercing the substrate (1.1) with retractable blades. The first spotlighting holes (1.1.1) are carried out according to a predefined position. Thus, the position of the spotlighting holes (1.1.1) is ensured regarding the substrate (1.1) and the positioner frame (2).

As all the steps, b), c) and d) are carried out in the same tool, the position of the first spotlighting holes (1.1.1) and the position of the positioner frame (2) regarding the substrate (1.1) is ensured.

The step e) can be carried out once the steps a), b), c) and d) are completed according to any of the options described above. In this step the substrate (1.1) comprising the positioner frame (2) and the spotlighting holes (1.1.1) is positioned in another tool wherein the transparent sheet (3) is attached to the second side (1.1.5) of the substrate (1.1) covering the first spotlighting holes (1.1.1), and optionally the first backlighting hole (1.1.3).

The step f) of attaching the decorative lining (1.2) to the second side (1.1.5) of the substrate (1.1) can be carried out once the steps a), b), c), d) and e) described above are completed.

The step f) can be carried out in a dressing tool wherein firstly, the assembly formed by the substrate (1.1), the positioner frame (2), the spotlighting holes (1.1.1) and the transparent sheet (3) is positioned as a single assembly, and secondly the decorative lining (1.2) is positioned on said single assembly in order to dress the substrate (1.1) and consequently forming the headliner (1).

Finally, steps g) and h) are carried out.

Preferably, the steps g) and h) are carried out simultaneously by lasering.

During these steps, firstly, the laser completely pierces the decorative lining (1.2) configuring the second spotlighting perforated areas (1.2.1), and optionally the second backlighting perforated area (1.2.4), then, it reaches the transparent sheet (3) and removes a part of the material thereof creating the diffusing areas (3.1).

In the optional case in which the transparent sheet (3) also comprises a mask (6) as it is described below, during these steps, the laser also removes a part of the material thereof creating the third spotlighting areas (6.1), and optionally the third backlighting area (6.2).

Both steps g) and h) are carried out ensuring the relative position of the second spotlighting perforated areas (1.2.1) and the diffusing areas, (3.1) and the substrate (1.1).

This position can be ensured for example by using the positioner frame (2) as centering device in the lasering tool to define the position of the second spotlighting perforated areas (1.2.1) and the diffusing areas (3.1). This position also can be ensured by using other headliner (1) part as centering device such as any of the holes provided for mounting the sunvisor.

Optionally the manufacturing of the headliner (1) step further comprises the step of providing a proximity sensor (5) between the decorative lining (1.2) and the substrate (1.1). Particularly said proximity sensor (5) is configured in the transparent sheet (3).

The proximity sensor (5) can be directly screen printed on the transparent sheet (3) or it can be screen printed on a transparent film (11) laminated on the transparent sheet (3).

Optionally the manufacturing of the headliner (1) step I further comprises a step of providing a mask (6) between the decorative lining (1.2) and the transparent sheet (3). The mask (6) comprises third spotlighting areas (6.1) aligned with the first spotlighting holes (1.1.1) along the main axis "r". In addition, the mask (6) can comprise a third backlighting area (6.2) aligned with the first backlighting hole (1.1.3) along the main axis "t".

The mask (6) can be directly screen printed on the transparent sheet (3) or it can be screen printed on a transparent film (11) laminated on the transparent sheet (3).

The manufacturing of the lighting module (4) step II in turn, comprises the following steps:

i) providing a printed circuit board (4.1) having an electric connector (4.4) configured to connect the printed circuit board (4.1) to the vehicle wiring, and having several spotlighting LEDs (4.2) connected to it, according to well defined positions which are ensured during its manufacturing process. Each spotlighting LED (4.2) configured to emit a first light beam L1 having a main axis "r".

Optionally the printed circuit board (4.1) comprises a backlighting LED (4.6) connected to it and being configured to emit a first signal light beam L5 having a main axis "t".

j) attaching an one piece optics (4.3) to the printed circuit board (4.1) by second attaching means (8), wherein the one piece optics (4.3) comprises several collimator lens (4.3.1), and the attaching step is carried out ensuring the alignment between each spotlighting LED (4.2) and each collimator lens (4.3.1). Optionally the one piece optics (4.3) comprises a diffusing lens (4.3.2) being in correspondence with the backlighting LED (4.6).

According to an optional case, the lighting module (4) further comprises a cover (4.5).

According to this optional case, the assembly formed by the printed circuit board (4.1) having several spotlighting LEDs (4.2) and the one piece optics (4.3), both connected to said printed circuit board (4.1) is firstly attached to the cover (4.5) by a fourth attachment means (12).

The attaching of the lighting module (4) to the headliner (1) step in turn, comprises the following steps:

k) attaching the lighting module (4) to the headliner (1) by attaching said lighting module (4) to the positioner frame (2) by third attaching means (9).

Finally, as result of the different steps above described it is obtained a vehicle headliner (1) with an integrated lighting module (4) having a spotlighting function wherein each spotlighting LED (4.2), each corresponding collimator lens (4.3.1), each corresponding first spotlighting hole (1.1.1), each corresponding diffusing area (3.1), and each corresponding second spotlighting perforated area (1.2.1) are aligned between them along the main axis "r" as FIGS. 5 and 6 show.

In the optional case in which a mask (6) is provided, the above aligned parts are also aligned with the corresponding third spotlighting area (6.1) along said main axis "r".

The invention claimed is:

1. Vehicle headliner (1) with an integrated lighting module (4) having a spotlighting function which is configured to emit a spotlighting beam L4, wherein the headliner (1) comprises:
   a substrate (1.1) having a first side (1.1.4) and a second side (1.1.5) and first spotlighting holes (1.1.1),
   a positioner frame (2) attached to the first side (1.1.4) of the substrate (1.1) by first attachment means (7),
   a decorative lining (1.2) having a third side (1.2.2) and a fourth side (1.2.3), wherein the third side (1.2.2) faces the second side (1.1.5) of the substrate (1.1), and having second spotlighting perforated areas (1.2.1),
   a transparent sheet (3) sandwiched between the substrate (1.1) and the decorative lining (1.2), said transparent sheet (3) covering the first spotlighting holes (1.1.1) and the second spotlighting perforated areas (1.2.1), said transparent sheet (3) has a fifth side (3.2) facing the second side (1.1.5) and a sixth side (3.3) facing the third side (1.2.2),
   the lighting module (4) comprises:
   a printed circuit board (4.1) having an electric connector (4.4) configured to connect the printed circuit board (4.1) to a vehicle wiring,
   several spotlighting LEDs (4.2) connected to the printed circuit board (4.1) and configured each of them to emit a first light beam L1 having a main axis r, characterized in that
   the lighting module (4) is attached to the positioner frame (2) by third attachment means (9),
   the lighting module (4) further comprises an one-piece optics (4.3) comprising several collimator lens (4.3.1) each of them being in correspondence with each of the spotlighting LED (4.2) and being configured to receive the corresponding first light beam L1 and to concentrate it in order to obtain a second light beam L2, said second light beam L2 configured to be emitted through the corresponding first spotlighting hole (1.1.1) towards the transparent sheet (3),
   the one piece optics (4.3) is attached to the printed circuit board (4.1) by second attachment means (8),
   the sixth side (3.3) of the transparent sheet (3) comprises diffusing areas (3.1) configured to uniformize the corresponding second light beam L2 in order to obtain the third light beam L3 configured to be emitted through the second spotlighting perforated areas (1.2.1) to a vehicle cabin,
   each spotlighting LED (4.2), the corresponding collimator lens (4.3.1), the corresponding first spotlighting hole (1.1.1), the corresponding diffusing area (3.1), and the corresponding second spotlighting perforated area (1.2.1) being aligned along the main axis r in such a way that a single spotlighting beam L4 is configured to be obtained by the overlapping of all of the third light beams L3 emitted through the second spotlighting perforated areas (1.2.1).

2. Vehicle headliner (1) with an integrated lighting module (4) having a spotlighting function according to claim 1 wherein the first side (1.1.4) of the substrate (1.1) further comprises an embossing (1.1.2) wherein the lighting module (4) is housed.

3. Vehicle headliner (1) with an integrated lighting module (4) having a spotlighting function according to claim 1 wherein the lighting module (4) further comprises a cover (4.5) which encloses the printed circuit board (4.1) between itself (4.5) and the first side (1.1.4) of the substrate (1.1).

4. Vehicle headliner (1) with an integrated lighting module (4) having a spotlighting function according to claim 1 wherein the transparent sheet (3) further comprises a proximity sensor (5).

5. Vehicle headliner (1) with an integrated lighting module (4) having a spotlighting function according to claim 4 wherein the proximity sensor (5) is a capacitive sensor.

6. Vehicle headliner (1) with an integrated lighting module (4) having a spotlighting function according to claim 1 wherein the lighting module (4) further comprises a backlighting LED (4.6) connected to the printed circuit board (4.1) and configured to emit a first signal light beam L5,
and the substrate (1.1) comprises a first backlighting hole (1.1.3) through which, the first signal light beam L5 can reach the vehicle cabin.

7. Vehicle headliner (1) with an integrated lighting module (4) having a spotlighting function according to claim 1 wherein the decorative lining (1.2) is translucent and the transparent sheet (3) comprises a mask (6) comprising third spotlighting areas (6.1) aligned with the first spotlighting holes (1.1.1) along the main axis r.

8. Vehicle headliner (1) with an integrated lighting module (4) having a spotlighting function according to claim 6 or claim 7 wherein the mask (6) comprising a third backlighting area (6.2) through which, the first signal light beam L5 can reach the vehicle cabin.

9. Manufacturing process for a vehicle headliner (1) with an integrated lighting module (4) having a spotlighting function which is configured to emit a spotlighting beam L4 according to claim 1, wherein the manufacturing process comprises the following steps:
I. manufacturing of the headliner (1) wherein its manufacturing process comprises the following steps:
a) providing a transparent sheet (3),
b) forming a substrate (1.1) having a first side (1.1.4) and a second side (1.1.5),
c) attaching a positioner frame (2) to the first side (1.1.4) of the substrate (1.1) by first attaching means (7) ensuring the relative position between said positioner frame (2) and the substrate (1.1),
d) providing first spotlighting holes (1.1.1) in the substrate (1.1) ensuring the relative position between said first spotlighting holes (1.1.1) and the substrate (1.1),
e) attaching the transparent sheet (3) to the second side (1.1.5) of the substrate (1.1) covering the first spotlighting holes (1.1.1),
f) attaching a decorative lining (1.2) having a third side (1.2.2) and a fourth side (1.2.3) to the substrate (1.1) in such a way that the third side (1.2.2) faces the second side (1.1.5),
g) providing second spotlighting perforated areas (1.2.1) in the decorative lining (1.2) by lasering ensuring the relative position between said second spotlighting perforated areas (1.2.1) and the substrate (1.1),
h) providing diffusing areas (3.1) in the transparent sheet (3) by lasering ensuring the relative position between said diffusing areas (3.1) and the substrate (1.1),
II. manufacturing of the lighting module (4) wherein its manufacturing process comprises the following steps:
i) providing a printed circuit board (4.1) having an electric connector (4.4) configured to connect the printed circuit board (4.1) to the vehicle wiring, and having several spotlighting LEDs (4.2) connected to it, each spotlighting LED (4.2) configured to emit a first light beam L1 having a main axis r,
j) attaching a one piece optics (4.2) to the printed circuit board (4.1) by second attaching means (8), wherein the one piece optics comprises several collimator lens (4.3.1), and the attaching step is carried out ensuring the alignment between each spotlighting LED (4.2) and the corresponding collimator lens (4.3.1) along the main axis r,
III—attaching the lighting module (4) to the headliner (1) by attaching said lighting module (4) to the positioner frame (2) by third attaching means (9)
k) obtaining a vehicle headliner (1) with an integrated lighting module (4) having a spotlighting function wherein each spotlighting LED (4.2), each corresponding collimator lens (4.3.1), each corresponding first spotlighting hole (1.1.1), each corresponding diffusing area (3.1), and each corresponding second spotlighting perforated area (1.2.1) are aligned between them along the main axis r.

10. Manufacturing process for a vehicle headliner (1) with an integrated lighting module (4) having a spotlighting function according to claim 9 which further comprises a step of providing a proximity sensor (5) between the decorative lining (1.2) and the substrate (1.1).

11. Manufacturing process for a vehicle headliner (1) with an integrated lighting module (4) having a spotlighting function according to claim 10 wherein the proximity sensor (5) is directly screen printed on the transparent sheet (3) or the proximity sensor (5) is screen printed on a transparent film (14) laminated on the transparent sheet (3).

12. Manufacturing process for a vehicle headliner (1) with an integrated lighting module (4) having a spotlighting function according to claim 9 which further comprises a step of providing a mask (6) between the decorative lining (1.2) and the transparent sheet (3), wherein the mask (6) comprises third spotlighting perforated areas (6.1) aligned with the second spotlighting perforated areas (1.2.1) along the main axis r.

13. Manufacturing process for a vehicle headliner (1) with an integrated lighting module (4) having a spotlighting function according to claim 12 wherein the mask (6) is directly screen printed on the transparent sheet (3) or the mask (6) is screen printed on a transparent film (14) laminated on the transparent sheet (3).

14. Manufacturing process for a vehicle headliner (1) with an integrated lighting module (4) having a spotlighting function according to claim 9 wherein the steps b) and c) are simultaneously carried out using the same tool.

15. Manufacturing process for a vehicle headliner (1) with an integrated lighting module (4) having a spotlighting function according to claim 9 or claim 14 wherein the steps b) and d) are simultaneously carried out using the same tool.

16. Manufacturing process for a vehicle headliner (1) with an integrated lighting module (4) having a spotlighting function according to claim 9 wherein the step d) is carried out outside the tool wherein the step b) is carried out.

17. Manufacturing process for a vehicle headliner (1) with an integrated lighting module (4) having a spotlighting function according to claim 9 wherein the second spotlighting perforated areas (1.2.1) are carried out using as position reference the substrate (1.1) or the positioner frame (2).

18. Manufacturing process for a vehicle headliner (1) with an integrated lighting module (4) having a spotlighting function according to claim 9 wherein the lighting module (4) further comprises a cover (4.5).

19. Manufacturing process for a vehicle headliner (1) with an integrated lighting module (4) having a spotlighting function according to claim 18 wherein the assembly formed by the printed circuit board (4.1) having several spotlighting LEDs (4.2) and the one piece optics (4.2), both connected to said printed circuit board (4.1), is attached to the cover (4.5) by fourth attachment means (12).

\* \* \* \* \*